May 9, 1967                 R. H. CARLSON              3,318,182
SELF-THREAD-FORMING SCREW WITH DRILL
POINT AND METHOD OF MAKING SAME

Filed Nov. 3, 1965                                      5 Sheets-Sheet 1

RAYMOND H. CARLSON
INVENTOR.
BY
BUCKHORN, BLORE, KLARQUIST & SPARKMAN
ATTORNEYS

May 9, 1967

R. H. CARLSON 3,318,182

SELF-THREAD-FORMING SCREW WITH DRILL POINT AND METHOD OF MAKING SAME

Filed Nov. 3, 1965

RAYMOND H. CARLSON
INVENTOR.

BY
BUCKHORN, BLORE, KLARQUIST & SPARKMAN
ATTORNEYS

May 9, 1967 R. H. CARLSON 3,318,182
SELF-THREAD-FORMING SCREW WITH DRILL
POINT AND METHOD OF MAKING SAME
Filed Nov. 3, 1965 5 Sheets-Sheet 3

RAYMOND H. CARLSON
INVENTOR.
BY
BUCKHORN, BLORE, KLARQUIST & SPARKMAN
ATTORNEYS

May 9, 1967 R. H. CARLSON 3,318,182
SELF-THREAD-FORMING SCREW WITH DRILL
POINT AND METHOD OF MAKING SAME
Filed Nov. 3, 1965 5 Sheets-Sheet 4

RAYMOND H. CARLSON
INVENTOR
BY
BUCKHORN, BLORE, KLARQUIST & SPARKMAN
ATTORNEYS

May 9, 1967    R. H. CARLSON    3,318,182
SELF-THREAD-FORMING SCREW WITH DRILL
POINT AND METHOD OF MAKING SAME
Filed Nov. 3, 1965    5 Sheets-Sheet 5

RAYMOND H. CARLSON
INVENTOR
BY
BUCKHORN, BLORE, KLARQUIST & SPARKMAN
ATTORNEYS

United States Patent Office 3,318,182
Patented May 9, 1967

3,318,182
SELF-THREAD-FORMING SCREW WITH DRILL POINT AND METHOD OF MAKING SAME
Raymond H. Carlson, Rockford, Ill., assignor to Textron Industries, Inc., Rockford, Ill., a corporation of Delaware
Filed Nov. 3, 1965, Ser. No. 506,234
10 Claims. (Cl. 85—41)

This application is a continuation-in-part of applicant's prior application, Ser. No. 358,124, filed Apr. 7, 1964, entitled Self-Tapping Screw With Drill Point and Method Of Making Same, which prior application is now abandoned.

This invention relates to self-thread-forming screws and, more particularly, to self-thread-forming screws having extruded flute drill points.

Screws of this type are conventionally made by rolling a thread on a pre-formed blank, then milling one or more longitudinally-extending grooves in such end, and subsequently machining the tip of the screw thereby to form one or more cutting edges. Such screws are obviously expensive to manufacture due to the operation last mentioned. Additionally, they cannot be made in very short lengths, since it is impossible to clamp very short screws so as to be able to perform the necessary flute milling operations. For example, it has not been possible heretofore to manufacture such drill-tap screws in lengths of less than ½-inch. This is particularly true when large heads are involved, inasmuch as the large heads have interfered with the milling cutter. Also, such screws could not be made with loose washers, which have prevented the necessary clamping for the flute milling operation. Furthermore, high stress concentrations develop in service at the junction of the shank and the drill point of the screw, due to the milling method by which the longitudinally-extending grooves are formed, and failures on account of breakage of the drill point are quite common with conventional screws. All of the aforementioned disadvantages of the prior art devices are overcome to a high degree by the screws of the present invention.

It is thus an object of the present invention to provide an improved self-thread-forming screw with an extruded drill point of increased strength and having a transition region at the junction of the shank and the drill point also of relatively higher strength as compared to the strength of the shank.

It is a further object of the present invention to provide such a screw in any length desired, and especially in short lengths, irrespective of the size of the head, and to provide such screws with washers if desired.

Another object of the invention is to provide a screw of the type described having an extruded drill point which is further provided with a hook at the cutting edges to improve the drilling action of the point.

It is a further object of the present invention to provide a method of making a self-thread-forming screw with an extruded drill point in an efficient and economical manner by a method that will eliminate the expense incurred in milling the drill point.

It is a still further object of the present invention to provide an economical method of making such a screw of any material, even stainless steel, which as is well known, is exceedingly hard to flute mill.

Another object is to provide a new and improved method for making a screw of the class described which includes the step of imparting a twist to the extruded drill point portion thereby forming a hook at the cutting edges.

A still further object of the invention resides in forming a hook at the cutting edges of the extruded drill point by upsetting the end of the extruded portion prior to forming the cutting edges and pointing the end.

In accordance with these objects, I have provided a self-drilling, self-thread-forming screw comprising an elongated threaded shank, a driving head at one end of the shank, and an extruded drill point at the other end thereof, the drill point having an effective transverse width substantially equal to or larger than the root diameter of the thread on said shank and having a cross-sectional area less than the cross-sectional area of the shank, the drill point and shank having an elongated grain structure in the transition region therebetween, and the drill point having an elongated grain structure therein, whereby the tensile strength of the drill point is substantially greater than the tensile strength of the shank, and the transition region at the junction of the shank and the drill point being of relatively higher strength as compared to the strength of the shank.

The method of my invention comprises the steps of preparing a cylindrical blank workpiece; enclosing the workpiece in an extrusion die cavity, and applying an extrusion pressure to one end of the workpiece while in the extrusion cavity, thereby to extrude a small portion from the opposite end, of such cross-sectional shape as is desired for the drill point. The thus extruded workpiece is then transferred to a heading die and any desired form of driving head is provided on the end thereof opposite the fluted tip. The tip is then machined to form a pair of drilling or cutting edges on the forward extremity thereof, and the workpiece is threaded in the portion between the head and the drill point with a taper lead on the thread. Where the screw is to be used to drill metal parts, it is desirable to provide a slight hook at the cutting edge. This hook may conveniently be formed by imparting a twist to the extruded end of the workpiece in the heading die, which may be provided with a bore having a helical twist, or the hook may be formed in any other suitable manner.

The fluted drill point of the screw of the present invention is desirably extruded in accordance with the methods disclosed in my U.S. Patents Nos. 3,072,933 and 3,104,161. Such extrusion provides the drill point with an elongated grain structure and, hence, a tensile strength substantially greater than the tensile strength of the threaded portion of the shank. In addition, the elongated grain structure formed in the transition region between the drill point and the shank provides that region with a relatively higher strength as compared to the shank.

Other objects and advantages of the invention will become apparent in the following specification, when taken in conjunction with the accompanying drawings, wherein.

Figure 1:
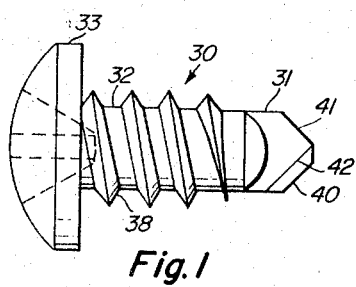
FIG. 1 is an elevational view of a drill point self-thread-forming screw made in accordance with this invention.
Figure 2:
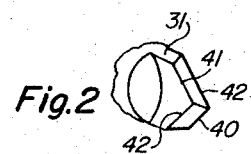
FIG. 2 is a perspective view of the drill point of the screw of FIG. 1.
Figure 3:
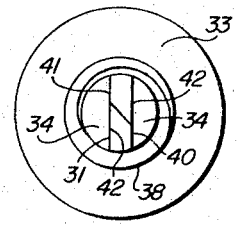
FIG. 3 is an end view of the screw of FIG. 1.

Referring to the drawings and in particular to FIGS. 1–3, a self-drilling, self-thread-forming screw 30 is shown with a drill point 31 made in accordance with one of the simplest forms of the previous invention. As will be observed, the screw 30 comprises an elongated shank 32, which terminates at one end in a driving head 33 and at the work-entering end in the drill point 31. The shape of the drill point 31 is, for convenience, described as fluted, the flutes being the 180° segments 34 removed from the circular cross-section. The drill point 31 is seen to have effective transverse width substantially equal to or larger than the root diameter of the thread or the shank 32. It will also be noted that the cross-sectional area of the drill point 31 is less than the cross-sectional area of the shank 32.

The shank 32 has a thread 38 thereon extending helically from the driving head 33 to the drill point 31. The thread 38 shown is of a conventional form, gradually tapering off to a zero height at its termination, or, in other words, provided with a suitable thread lead angle.

The drill point 31, best shown in FIGS. 2 and 3, terminates in a pair of cutting edges 40, 41 at the work-entering extremity thereof. These cutting edges 40, 41 form a V-shaped cutting or drill point. The cutting edges 40, 41 are provided with a relief 42, which permits the drill point 31 to drill a hole in the work when the screw 30 is turned in the threading direction.

In the operation of the screw, after the cutting edges 40, 41 drill through the workpiece, the tapered end portion of the thread 38 forms a cooperating thread in the drilled hole and permits the screw to be driven home.

Figure 4:
FIG. 4 is an elevational view of the initial workpiece from which the screw of FIG. 1 is formed.

In accordance with the method of this invention, the screw of FIGS. 1–3 is produced in the following manner. A cylindrical workpiece 50, such as shown in FIG. 4, of predetermined length is severed from a length of stock material (not shown) of predetermined diameter. This latter diameter is desirably that of the shank prior to threading. Preferably, the volume of the workpiece 50 is made substantially equal to the volume of the screw to be formed.

Figure 5:
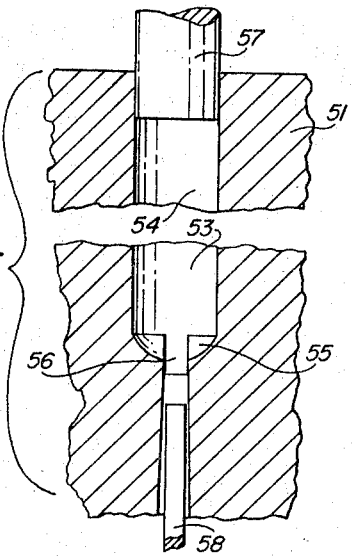
FIG. 5 is a sectional view showing the extrusion die utilized in the process of the invention.

After severing the workpiece 50, it is positioned in an extrusion die 51, such as that schematically shown in FIG. 5, and a small portion 49 of the workpiece 50 (see FIG. 6) is extruded in any desired cross-sectional shape from which the fluted drill point 31 of the screw 30 may be formed. An extrusion die comparable to die 51 is more fully disclosed in my U.S. Patent No. 3,072,933. The inner end 53 of the die cavity 54 has an inwardly converging, concavely curved shoulder or surface 55, which terminates in an extrusion orifice 56 having the desired cross-sectional shape of the fluted drill point 31 of the screw 30. Endwise extrusion pressure is applied to the workpiece 50 positioned within the die cavity 54 by a punch 57, and this pressure is applied to the workpiece 50 until the extruded portion 49 is of the desired length. Thereafter, the punch 57 is removed and the workpiece extracted from the extrusion die 51 by a rectangular knock-out pin 58.

Figure 6:
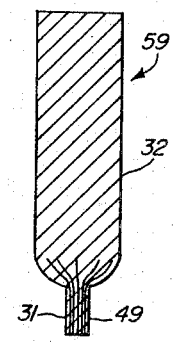
FIG. 6 is a sectional view of the workpiece after extrusion of the fluted tip and indicates schematically the elongated grain structure obtained.

The blank then appears as shown in longitudinal section in FIG. 6 and will be referred to by numeral 59. FIG. 6 illustrates schematically the elongated grain structure extending generally parallel with the axis of the blank obtained by the extrusion process in the transition region between the drill point 31 and the shank 32 and in the drill point 31. As explained in my prior Patent 3,072,933, the tensile strength of the metal of the extruded drill point is thereby rendered substantially greater than the tensile strength of the metal of the remainder of the blank. In addition, the transition region at the junction of the shank 32 and the drill point 31 is also provided with a relatively higher strength, as compared to the strength of the metal prior to extrusion.

Figure 7:
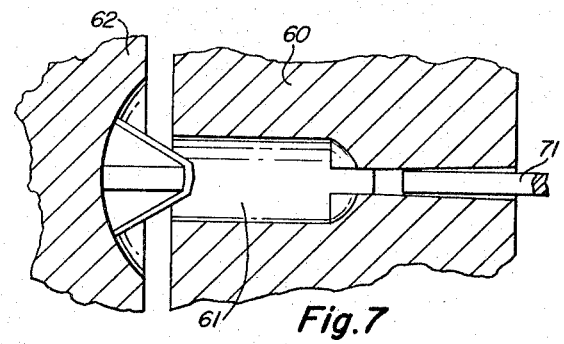
FIG. 7 is a sectional view of the die and punch utilized to form the head of the screw and punch the recess therein.
Figure 8:
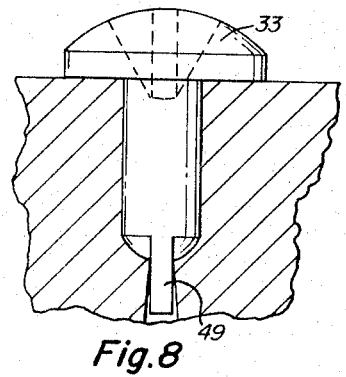
FIG. 8 is an elevational view of the screw of FIG. 1 after the driving head has been formed thereon.
Figure 9:
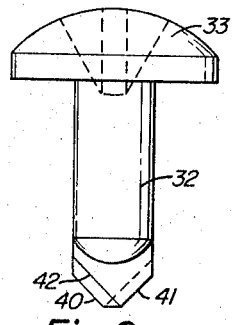
FIG. 9 is an elevtaional view of the screw of FIG. 1 after the tip has been machined to form the pair of cutting edges thereon.
Figure 10:
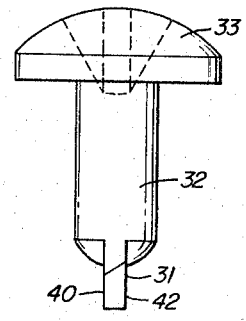
FIG. 10 is a side elevational view of the screw shown in FIG. 9.

The blank 59 is then transferred to a heading die 60, as shown in FIG. 7, having a complementary cavity 61 for receiving the same. The blank 59 is then provided with any suitable driving head such as by a heading punch 62. The blank, now shown in FIG. 8, is extracted from the die 60 by means of a knock-out pin 71.

The blank is then clamped in a suitable jig and the tip of the extruded portion 49 is machined to form the pair of drilling or cutting edges 40, 41, which are provided with the relief 42. Particular attention is directed to the fact that for machining the cutting edges 40 and 41, the shank 32 of the blank is unthreaded and may be more firmly, and more easily clamped than in the case of other forms of drill screws which must be threaded before the final machining operations.

Because of this fact, together with the fact that the step of milling flutes is entirely eliminated, the speed of manufacture may be considerably increased, and the cost decreased. It will be understood that the extrusion step shown in FIG. 5 may be performed in the same heading machine in which the head of the screw is formed, so that the extrusion step of FIG. 5 is a low cost operation.

The shank 32 of the screw between the driving head 33 and the drill point 31 is then rolled between suitable dies (not shown) to form the thread 38 thereon. The finally finished screw 30 appears, of course, substantially as shown in FIG. 1.

It is thus apparent that the method of this invention eliminates completely the milling operation that has been conventionally used heretofore to form the drill point. It is also apparent that, in accordance with the method of the invention, the fluted drill point is formed while the screw is in the blank state. The method of the invention provides a drill point of substantially increased strength, and is particularly well adapted to the production of very short screws, that is, those having lengths of less than ½-inch, and to screws having large heads which heretofore have interfered with the milling cutter. It is possible to provide such drill-tap screws with washers, the presence of which has heretofore prevented the necessary clamping of the screw so as to be able to mill the end thereof. It is also possible to manufacture drill-tap screws by the method of this invention of any material even stainless steel.

It is to be understood that the cross-sectional shape of the drill point is shown in its simplest form in FIGS. 1–10 and that it is a feature of the method of the present invention that substantially any desired cross-sectional shape may be imparted to the extruded drill point. A few further specific cross-sectional configurations will be described.

Figure 11:
FIG. 11 is an elevational view of the drill point of a modified version of the screw of this invention.
Figure 12:
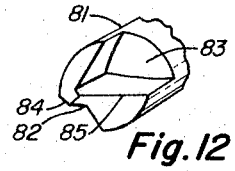
FIG. 12 is a perspective view of the drill point of the screw of FIG. 11.
Figure 13:
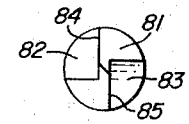
FIG. 13 is an end view of the screw of FIG. 11.

FIGS. 11–13 illustrate a method version of the screw of this invention, which can also be made by the method disclosed. The drill point 81 is extruded in a die similar to that shown in FIG. 5 to form two longitudinally extending V-shaped grooves 82, 83, therein. The tip is machined to form the relieved cutting edges 84, 85.

Figure 14:
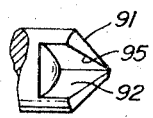
FIG. 14 is an elevational view of the drill point of still another modified version of the screw of this invention.
Figure 15:
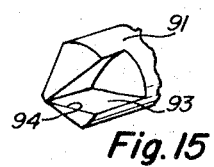
FIG. 15 is a perspective view of the drill point of the screw of FIG. 14.
Figure 16:
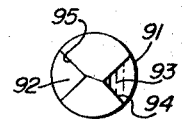
FIG. 16 is an end view of the screw of FIG. 14.

FIGS. 14–16 disclose still another modified version of the screw of this invention, which can also be made by the method disclosed. The drill point 91 is extruded in a die similar to that shown in FIG. 5 to form two longitudinally-extending grooves 92, 93 therein. The tip is machined to form the relieved cutting edges 94, 95.

Figure 17:
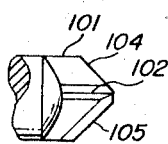
FIG. 17 is an elevational view of the drill point of still another modified version of the screw of this invention.
Figure 18:
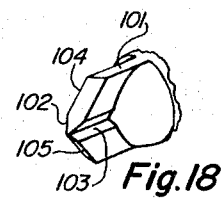
FIG. 18 is a perspective view of the drill point of the screw of FIG. 17.
Figure 19:
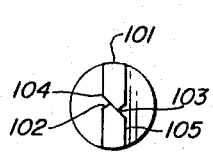
FIG. 19 is an end view of the screw of FIG. 17.

FIGS. 17–19 disclose still another modified version of the screw of this invention, which can also be made by the method disclosed. The drill point 101, which is symmetrical about the longitudinal axis of the screw, is extruded in a die similar to that shown in FIG. 5 with two longitudinally-extending grooves 102, 103 in each of the opposed flat faces. The grooves 102, 103 are each laterally offset with respect to the longitudinal centerline, as shown. The tip is machined to form the relieved cutting edges 104, 105. The grooves 102, 103 improve the drilling proportions of the screw in that they reduce the width of the tip between the cutting edges 104, 105, and which is turn reduces the drilling time.

Figure 20:
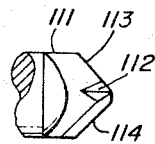
FIG. 20 is an elevational view of the drill point of still another modified version of the screw of this inventoin.
Figure 21:
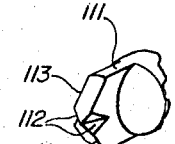
FIG. 21 is a perspective view of the drill point of the screw of FIG. 20.
Figure 22:
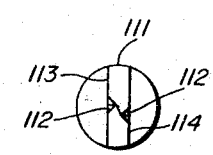
FIG. 22 is an end view of the screw of FIG. 20.

FIGS. 20–22 disclose still another modified version of the screw of this invention, which can also be made by the method disclosed. The opposed flat faces of the drill point 111 are indented as shown at 112 at the V-point thereof. The drill point 111 is extruded in a die cavity similar to that shown in FIG. 5, and the tip is machined to form the indented portions 112 and the relieved cutting edges 113, 114. The indented drill point 111 also improves the drilling properties of the screw as in the case of the screw of FIGS. 17–19.

Figure 23:
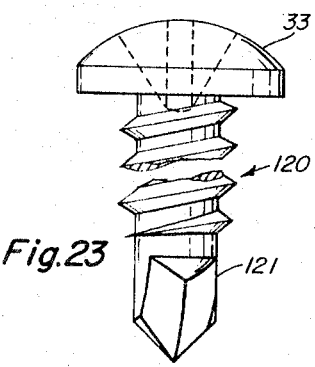
FIG. 23 is an elevational view of a screw made in accordance with this invention and having a twisted drill point.

FIG. 23 discloses a screw 120 made in accordance with this invention and having a helically twisted drill point 121. Where a self-drilling, self-tapping screw is to be used to drill through metal, the drill point thereof should be at least greater in length than the thickness of the metal being drilled and is desirably provided with a hook at the cutting edges. The drill point 121 of the screw 120 is twisted to provide an approximate 10° hook at the end thereof. The cross-sectional shape of the drill point 121 corresponds with the shape shown in FIGS. 11–13.

Figure 24:
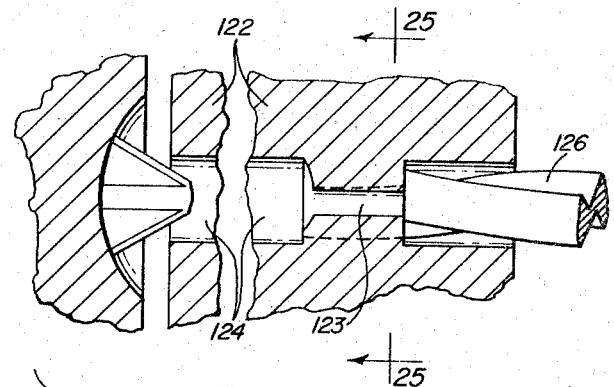
FIG. 24 is a sectional view of a die and punch that can be utilized to form the head of the screw of FIG. 23 and simultaneously impart the necessary twist to the drill point thereof.
Figure 25:
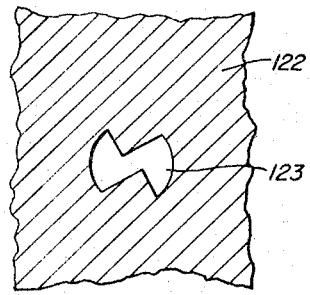
FIG. 25 is a cross-sectional view taken on line 25—25 of FIG. 24.

The twist may be imparted to the drill point 121 by screw 120 in a heading die 122, as shown schematically in FIG. 24. The die 122 is similar in construction to the die 60 shown in FIG. 7, except that the portion 123 of the cavity 124 is provided with a helical twist and thus adapted to impart the required helical twist to the extruded portion of the blank. As the head of the blank 59 is formed, the extruded portion thereof is driven into the cavity portion 123 and is twisted thereby as illustrated. FIG. 25 shows the cross-sectional shape of the cavity portion 123 of the die 122. The screw 120 is extracted from the die 122 by means of a rotatable knock-out pin 126, which is similar in cross section to the drill point 121. A non-rotatable knock-out pin in the form of a flat blade, as illustrated at 58 in FIG. 5, may also be used, but it must be thin enough so to be able to pass through the twisted cavity portion 123.

Figure 26:
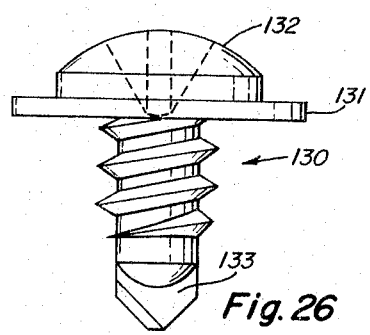
FIG. 26 is an elevational view of a screw made in accordance with this invention and including a washer and a large head.

FIG. 26 illustrates a screw 130 having an integral washer 131 and head 132 that can be made by the method of this invention. Heretofore, the presence of the washer 131 has precluded the milling of the drill point 133 except in the longer lengths, since the large washer interfered with the milling cutter. Also, by the method of this invention, screws with loose lock washers can be made with drill points, as there is no need to clamp the screws to enable milling of the flutes after the thread rolling operation has been performed.

Figure 27:
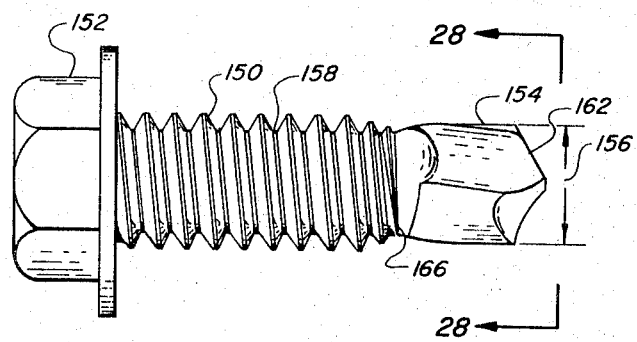
FIG. 27 is a side elevational view illustrating a still further modification of a screw according to the present invention.
Figure 28:
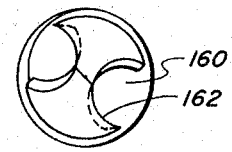
FIG. 28 is in end view of the point of the screw shown in FIG. 27, certain portions being shown in dotted lines to indicate more clearly the structure.
Figure 29:
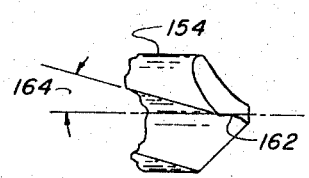
FIG. 29 is a fragmentary view of the forward end portion of the screw shown in FIG. 27, but rotated through an angle of approximately 90 degrees.

Referring to FIGS. 27, 28 and 29 there is illustrated a still further modification of a screw which includes, in this instance, a shank portion provided with a machine thread 150 and a hex washer head 152 at one end and a twisted drill point 154 at the opposite end. The effective diameter or transverse width of the drill point, indicated by the dimension 156, is greater than the diameter of the root 158 of the thread 150, but substantially less than the diameter of the crest of such thread. In the formation of the screw, the end portion of the blank is extruded in the manner previously described and illustrated in connection with FIGS. 4–6, execpt in this instance the extruded portion is provided with concave flutes 160 on oposite sides thereof.

The blank is then inserted into a heading die and during the upsetting and formation of the hex head 152, the extruded portion is driven into a twisted extension of the die cavity and twisted throughout by an angle such that the cutting edges 162 of the finished V-point are given a hook angle of the order of 5 to 15 degrees, as indicated by angle 164 in FIG. 29. It may be varied considerably depending upon the nature of the material into which the screw is primarily intended to be driven.

It is to be understood that if during the extrusion of the portion forming the drill point, the effective width or diameter of the extruded portion, as indicated at 156, is maintained substantially the same as that of the blank stock, or is only slightly reduced in width, then during the roll-threading operation the diameter of the root 158 of the thread will be reduced in diameter to an amount considerably less than the diameter 156, while at the same time the diameter of the crest of the thread is raised to an amount greater than the diameter 156. The starting end of the thread indicated at 166 begins at a point which is diametrically smaller than the diameter 156 so that the thread will quickly pick up and immediately begin the thread-forming operation into the sidewall of the drilled hole as soon as such hole has been formed. In other words, in this situation, the end 166 of the thread is closer to the axis of the screw than the radial dimension of the hole formed by the drill point 154.

It will be obvious that in the case of a machine screw type of thread illustrated in FIG. 27 and with the size of the hole formed by the drill point 154, which is approximately equal to the pitch diameter of the thread 150, the thread that will be formed in the sidewalls of the drilled hole will approach full thread height. Moreover, the crest diameter of the female thread thus formed will be less than the diameter of the drill point so that after the screw has been driven home it will be more or less locked in place. Of course, the screws may be withdrawn, but in doing so the female threads will be ironed out as the enlarged drill point is backed out through the threaded hole.

On account of the fact that more or less full-size threads are produced in the sidewalls of the drilled hole by the screws of the present invention, these will provide a much higher strip-out strength than in the case of those types of prior art drill screws in which a flute is milled in a direction axially of the screw and across a number of threads at the work-entering end, forming cutting edges at the ends of the threads intersected by the milled flute. Such screws are commonly referred to as self-tapping screws in that the cutting edges produced on the ends of the threads at the work-entering end tend to cut threads in the sidewalls of the drilled hole in much the same manner as a conventional fluted tap. The screws of the present invention are to be distinguished from such thread-cutting screws and are therefore more accurately defined herein as self-thread-forming screws. As is well known in the case of thread cutting screws, the resultant threads formed in the sidewalls of the drilled holes usually are very weak for the reason that the threads are formed by a cutting operation rather than by a swaging operation. The strip-out torque or strength of such screws therefore is relatively low as compared with that of the present screws where the threads are swaged and, moreover, are usually of the order of 70 percent of full thread height.

Figure 30:
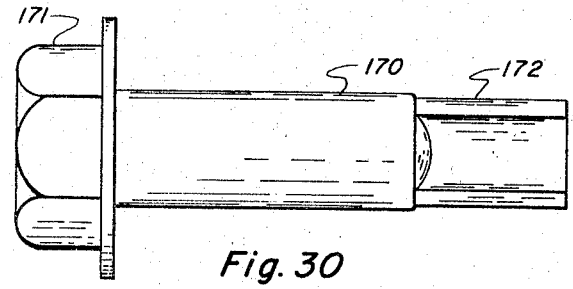
FIG. 30 is a side elevation of a partially formed blank for a screw in accordance with a further embodiment of the invention.

In some instances, it may be desirable to upset the end of the extruded portion of the blank to obtain an enlarged effective diameter for the drill point as well as a hook to the cutting edges. For example, in FIG. 30 is shown a cap screw blank consisting of a shank portion 170, a hex washer head 171 at one and an extruded portion 172 at the opposite end. In this instance, the extruded portion 172 is illustrated as having an effective or maximum diameter which is slightly less than the diameter of the shank portion 170 and which reduction has occurred during the extrusion of the fluted portion 172.

Figure 31:
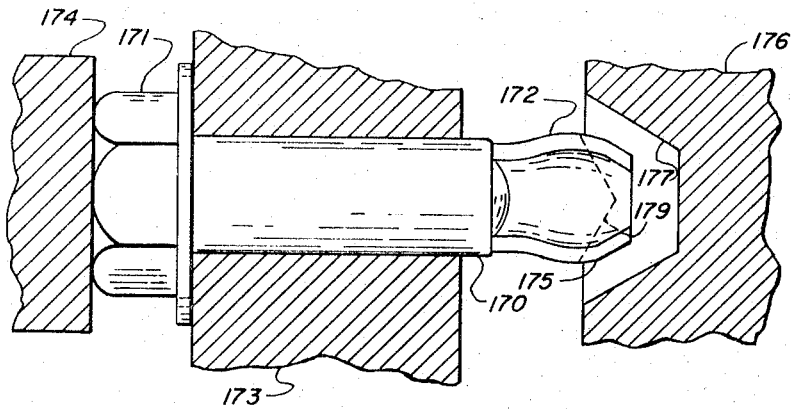
FIG. 31 is a view illustrating the manner in which the end portion of the blank shown in FIG. 30 may be upset to obtain twist angle or hook for improving cutting of drill point.

The extruded end portion 172 may be upset, such as for example in the manner indicated schematically in FIG. 31. In this instance, the blank is mounted within a suitable holder or locator 173, with the head 171 engaged by a stop 174. The end of the extruded portion 172 may then be upset, as indicated at 175, by advancing an upsetting tool 176 provided with a suitable forming recess 177 thereagainst.

Figure 32:
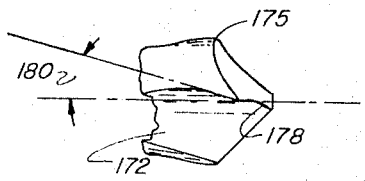
FIG. 32 is a fragmentary view illustrating the end of the upset extruded portion shown in FIG. 31 after it has been machined to form the cutting edges.

FIG. 32 illustrates the end of the blank after it has been milled so as to form the cutting edges 178 thereupon. The milling operation will be performed across the widest point of the bloom 175 of the extruded end portion 172, as indicated by dotted lines 179 in FIG. 31, so that the effective maximum diameter of the drill point will be slightly greater than the original diameter of the extruded portion 172, and preferably, slightly greater than the diameter of the shank portion 170. Also, a hook angle indicated at 180 is provided behind the cutting edge 178, which is comparable to the hook angle 164 illustrated in FIG. 29, inasmuch as the surface of the forward fluted wall portion adjacent the cutting edge slopes slightly rearwardly, as illustrated, at an angle of from 5 to 15 degrees, as desired.

Figure 33:
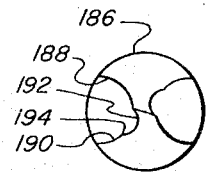
FIG. 33 is an end view of a screw similar to the end view shown in FIG. 28, but illustrating a still further embodiment of the invention.

As previously indicated, virtually any desired cross-sectional shape or configuration may be imparted to such portion during the extrusion of the drill-point forming portion from the blank. In FIGS. 11 to 22 and in FIG. 28 are illustrated a few of the possible flute configurations. A still further flute configuration is illustrated in FIG. 33. In this instance, the drill point 186 is provided with concave flutes 188 on the opposite sides thereof. The faces of the drill point defining the flutes 188 are each provided on the portions defining the cutting edges 190 with smaller concave grooves 192 defining chip breaker ribs 194 on the cutting edge.

The provision of any desired form of such chip breaker ribs on the cutting edges is greatly simplified by the method of manufacture herein disclosed. It is merely necessary to design the cross-sectional shape of the extrusion orifice in the extrusion die so as to impart the desired rib configuration to that wall of the flute which is to terminate along the cutting edge of the drill point. This, of course, necessitates that the grooves 192 be displaced from the midpoint of the flutes and be placed on the leading face portion of the drill point defining the flutes 188.

It is also readily possible to provide drill points on screws of low-torque thread-forming types in accordance with the method of the present invention. One form of such screw is currently available on the market and sold under the trademark Taptite, such screw being characterized by a thread of arcuate triangular cross-sectional configuration.

In my Patent 3,104,161, I disclosed in Figs. 1 to 9 thereof one method for manufacturing such a screw. A screw of such type is further illustrated in FIGS. 34 and 35 as having a shank portion provided with threads 200 which are of arcuate triangular cross-sectional configuration as illustrated more clearly in the end view of FIG. 35. The screw is further provided with a hex washer head 202 and a drill point 204. The blank for this screw is shown in the partially formed condition in FIG. 36 and includes in addition to the upset head 202 an unthreaded shank portion 206 and a twisted extruded end portion 208 which is illustrated more clearly in the end view of FIG. 37.

Figure 34:
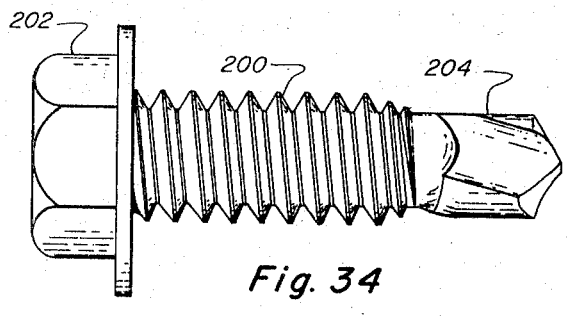
FIG. 34 is a side elevational view of a still further screw illustraing another embodiment of the invention.
Figure 35:
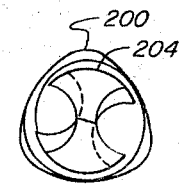
FIG. 35 is an end view of the screw illustrated in FIG. 34.
Figure 36:
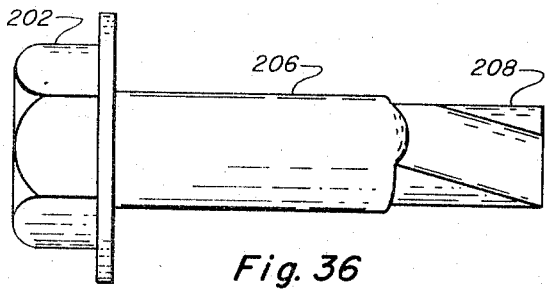
FIG. 36 is a side elevation of a partially formed blank for use in connection with the manufacture of the screw shown in FIGS. 34 and 35.
Figure 37:
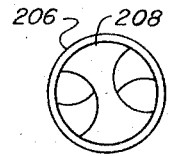
FIG. 37 is an end view of the blank shown in FIG. 36.
Figure 38:
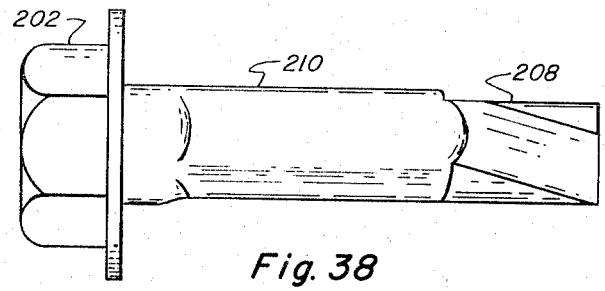
FIG. 38 is a side elevational view of the blank shown in FIG. 36 after conversion of the shank portion thereof into an arcuate triangular shape.
Figure 39:
FIG. 39 is an end view of the blank shown in FIG. 38.

The blank thus illustrated in FIG. 36 is substantially the same as those previously described, the shank portion 206 being of circular cross-sectional shape. The blank may then be forced into a re-extruding die substantially as described in my above-mentioned patent, so as to convert the cross-sectional shape of the shank portion from the round configuration, illustrated in FIGS. 36, 37, into an arcuate triangular configuration, as illustrated at 210 in FIGS. 38 and 39. It is to be understood, of course, that the diameter of the round shank portion 206 of the blank must be slightly larger than the maximum diameter of the extruded end portion 208 in order that the extruded portion 208 will pass freely through the bore of the re-extruding die without being altered in shape thereby. When the shank portion 210 is roll threaded, as illustrated in FIGS. 34 and 35, the maximum transverse dimension, or width, of the root cylinder, or root surface, of the finished thread is less than the maximum or effective diameter of the drill point 204. Also, the thread pickup, or lead angle, of the finished screw shown in FIG. 34 is substantially the same as that shown in FIG. 27. Due to the arcuate triangular configuration of the thread provided on the screw in this instance, the driving torque of the screw shown in FIG. 34 will be substantially less than that for the screw shown in FIG. 27, the latter having a thread of conventional circular cross-sectional shape.

In all of the various modifications of screws described above, the metal portion forming the drill point is extruded to the desired fluted cross-sectional shape from the end of the round metal workpiece or slug severed from the length of raw material. By extruding the flutes in the manner described rather than machining them, a saving of the order of approximately 10 percent in manufacturing cost may be accomplished. Not only is such a reduction in cost made possible by the present invention, but at the same time very considerable improvement in the quality of the end product is achieved. In laboratory tests, the torsional strength of the drill points of screws constructed in accordance with the present invention were found to be at an average of over 15 percent greater than the torsional strength of comparable screws in which the flutes were machined on the drill point end in accordance with the prior art.

While I have described my invention with respect to the manufacture of several different embodiments, it must be realized that the invention permits numerous modifications in arrangement and detail. I therefore claim as my invention all such modifications as come within the true spirit and scope of the appended claims.

I claim:

1. A self-drilling, self-thread-forming screw, comprising:
    (a) an elongated shank having a rolled thread provided with an inwardly tapered forward end;
    (b) a driving head at one end of said shank; and
    (c) an extruded drill point at the other end of said shank,
    (d) said drill point having an effective transverse width at least equal to the root diameter of the threads on said shank, and
    (e) said drill point having flutes extending the full lentgh thereof and on opposite sides thereof;
    (f) the entire length of said drill point having an elongated grain structure extending in the same direction as the longitudinal axis of said screw and the transition region between said drill point and said shank also having an elongated grain structure therein as a result of the extrusion thereof, whereby the tensile strength of the metal of said drill point and of said transition region at the junction of said shank and said drill point is of relatively higher strength as compared to the strength of the metal of said shank.

2. A self-drilling, self-thread-forming screw in accordance with the invention of claim 1 and being further characterized in that the thread on said shank is provided with a root, pitch, and crest of arcuate triangular cross-sectional configuration.

3. In a self-drilling, a self-thread forming screw having a threaded shank, and a driving head at one end, the invention comprises:
    (a) an extruded drill point on the end of said shank opposite said head, and the entire length of said drill point and the transition region between said shank and said drill point having an elongated grain structure, the grain structure in said drill point extending in a direction generally parallel with the axis of said screw, whereby the torsional strength of said drill point and of said transition region is of relatively higher strength as compared to the strength of the metal throughout the remainder of said screw;
    (b) said point including a pair of oppositely disposed flutes defining a pair of cutting edges and the extremity of said point being bent slightly in the same direction of rotation about the axis of said screw providing a hook angle behind the cutting edges relative to said axis of the order of five to fifteen degrees;
    (c) the effective width of said drill point being slightly greater than the root diameter of the thread on said shank, but less than the crest diameter of such thread;
    (d) the crest of the end of the thread adjacent said drill point having a radial dimension less than the maximum radial dimension of said drill point.

4. The method of making a drill point self-thread-forming screw which comprises the steps of:
    (a) preparing a cylindrical blank workpiece;
    (b) enclosing said workpiece in an extrusion die cavity;
    (c) applying an extrusion pressure to one end of said workpiece while in said cavity, thereby extruding a small portion from the opposite end to form a fluted tip on the end of said workpiece extending the full length of the drill point;
    (d) transferring said workpiece to a heading die and therein forming a driving head on the end thereof opposite said tip;
    (e) machining said tip to form a pair of cutting edges on the forward extremtiy thereof; and
    (f) roll threading the shank portion of said workpiece between said head and said tip.

5. The method of making a screw as described in claim 4, which includes the further step of twisting the fluted tip portion on the end of said workpiece simultaneously with the formation of said driving head so as to form a hook for each of the cutting edges thereon.

6. The method as described in claim 4, which includes the further step of providing a helical extension in the cavity of the heading die so as to receive the fluted tip of the workpiece and bending slightly said fluted tip on opposite sides of the longitudinal axis of said workpiece in the same direction of rotation about said axis by forcing said fluted tip into said extension during formation of the driving head.

7. The method of making a screw as described in claim 4, which includes the further step of upsetting the end of said extruded and fluted tip portion so as to enlarge the same prior to the formation of the cutting edges thereon.

8. The method of making a screw as described in claim 4, which includes the further step of upsetting the end of said extruded and fluted tip to form a bloom thereupon, and then machining the tip end across the point of maximum width of the bloom to form the cutting edges of the drill point whereby to form a hook with the forward surface of said flutes adjacent said cutting edges.

9. The method of making a drill point self-thread-forming screw as described in claim 4 and which includes the further step of extruding a shank portion of said workpiece next adjacent said tip into an arcuate triangular cross-sectional configuration and thereafter roll-threading such shank portion.

10. The method of making a screw as described in claim 4 which includes the further step of enlarging the end of said tip portion prior to the formation of the cutting edges thereon by an amount such that the effective maximum diameter of the drill point will be slightly greater than the diameter of the shank portion of the workpiece.

References Cited by the Examiner

UNITED STATES PATENTS

| | | | |
|---|---|---|---|
| 410,614 | 9/1889 | Steiner | 74—108 |
| 2,030,290 | 2/1936 | Friedman | 10—27.1 |
| 2,314,391 | 3/1943 | De Vellier | 10—10 |
| 2,388,482 | 11/1945 | Haynes | 85—47 |
| 2,422,994 | 6/1947 | Taylor | 76—108 |
| 2,547,132 | 12/1948 | Delaney | 76—108 |
| 2,764,042 | 9/1956 | Gotze | 76—108 |
| 3,072,933 | 1/1963 | Carlson | 10—27.1 |
| 3,079,831 | 3/1963 | Gutshall | 85—47 |
| 3,094,894 | 6/1963 | Broberg | 85—47 |
| 3,195,156 | 7/1965 | Phipard | 10—10 |
| 3,218,905 | 11/1965 | Reiland | 85—47 |

FOREIGN PATENTS

| | | |
|---|---|---|
| 1,008,781 | 2/1952 | France. |
| 1,268,396 | 6/1961 | France. |
| 690,269 | 4/1953 | Great Britain. |
| 943,897 | 12/1963 | Great Britain. |

CARL W. TOMLIN, *Primary Examiner.*

MARION PARSONS, Jr., *Examiner.*